United States Patent [19]

Capolupo et al.

[11] Patent Number: 4,925,889

[45] Date of Patent: May 15, 1990

[54] STABILIZED CARBON BLACK LOADED POLYOLEFINS

[75] Inventors: Janet D. Capolupo, Watertown; Thomas M. Chucta, Naugatuck, both of Conn.

[73] Assignee: Uniroyal Chemical Company, Inc., Middlebury, Conn.

[21] Appl. No.: 265,286

[22] Filed: Oct. 26, 1988

Related U.S. Application Data

[63] Continuation of Ser. No. 101,708, Sep. 25, 1987, abandoned.

[51] Int. Cl.$^5$ .............................. C08K 5/43; C08K 3/04
[52] U.S. Cl. ..................................... 524/169; 524/258; 524/586
[58] Field of Search ........................................... 524/169

[56] References Cited

U.S. PATENT DOCUMENTS

| | | |
|---|---|---|
| 2,734,808 | 2/1956 | Biswell . |
| 3,304,283 | 7/1967 | Hawkins et al. . |
| 3,419,639 | 12/1968 | Gentile . |
| 3,432,578 | 3/1969 | Martin . |
| 3,452,056 | 6/1969 | Sundholm . |
| 3,505,225 | 4/1970 | Wheeler . |
| 3,567,664 | 3/1971 | Haring . |
| 3,637,865 | 1/1972 | Haring . |
| 3,655,559 | 4/1972 | Holt . |
| 3,979,180 | 9/1976 | Lorand . |
| 4,007,230 | 2/1977 | Hinze . |
| 4,341,677 | 7/1982 | Tamosauskas . |
| 4,420,579 | 12/1983 | Braid . |
| 4,440,671 | 4/1984 | Turbett . |
| 4,497,931 | 2/1985 | Hollis . |
| 4,616,075 | 10/1986 | Malani et al. ...................... 528/490 |

FOREIGN PATENT DOCUMENTS 59-098148A  6/1984  Japan .

*Primary Examiner*—John C. Bleutge
*Assistant Examiner*—David W. Woodward
*Attorney, Agent, or Firm*—Raymond D. Thompson

[57] ABSTRACT

A composition stabilized against oxidative degradation comprising: a polyolefin, carbon black homogeneously incorporated in said polyolefin, a stabilizing amount of a N-phenyl-N'-(p-toluenesulfonyl)-p-phenylenediamine first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin.

6 Claims, No Drawings

STABILIZED CARBON BLACK LOADED POLYOLEFINS

This is a continuation, of application Ser. No. 101,708 filed Sept. 25, 1987, now abandoned.

BACKGROUND OF THE INVENTION

This invention relates to the stabilization of polyolefin resin against thermal-oxidative degradation by the use of mixtures of N-phenyl-N'-(p-toluene-sulfonyl)-p-phenylenediamine and selected amine antioxidants. In particular linear low density polyethylene having a carbon black loading can be stabilized for use in applications such as wire and cable jacketing.

BACKGROUND ART

The problem of achieving thermal-oxidative stabilization of polymeric resins is a long-standing one in the wire and cable industry. It is known to stabilize polyolefins, such as polyethylene with N,N'-dibetanaphthyl-p-phenylenediamine which is commercially available from R. T. Vanderbilt Co. as Agerite White. This composition provides good thermal stability, but there is a need to find substitutes which are biologically inert materials.

U.S. Pat. No. 4,440,671 teaches stabilization of ethylene polymers against degradation evidenced by tiny cracks, called water trees. The stabilization requires the use of high molecular weight polyethylene glycols with a hydrocarbon substituted diphenylamine such as octylene or styrene alkylated diphenylamine. Optionally, this system can be used with optional antioxidants such as hindered phenols and amines, polymerized 2,2,4-tetramethylhydroquinoline, and sulfur-containing antioxidant materials.

Japanese patent publication No. 1984-98148 teaches the discoloration inhibition of cross-linked polyolefins using 4,4'bis-(2,2'-dimethylbenzyl)diphenylamine with optional antioxidants which are liquid at room temperature such as: 4,4'-thiobis(7-tert-butyl-3-methylphenol); dilauryl dithiopropionate; 2,2,-thio[diethyl bis-3-(3,5diethyl-tert-butyl-4-hydroxy-phenyl)]propionate. These polyolefins necessarily contain cross-linking agents such as the well-known organic peroxides.

It has been surprisingly found that only a very select number of the materials disclosed as useful in the prior art demonstrate synergistic effect when used in combination to protect polyolefins.

BRIEF DESCRIPTION OF THE INVENTION

An object of the invention is to provide a synergistic improvement in the level of thermal-oxidative stability protection for polyethylene homopolymer resins. A further object is to protect carbon black loaded linear low density polyethylene from degradation caused by intense shearing and mastication resulting from processing of the polyethylene resin in production of finished products. An advantage of the invention is that the polyethylene resin may be provided with substantially greater degrees of protection as defined by an oxidative induction time.

The benefits and advantages of the invention may be obtained using a composition stabilized against oxidative degradation comprising: a polyolefin, carbon black homogeneously incorporated in said polyolefin, a stabilizing amount of a N-phenyl-N'-(p-toluenesulfonyl)-p-phenylenediamine first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin.

DETAILED DESCRIPTION OF THE INVENTION

In the practice of this invention, the first critical component of the antioxidants type is N-phenyl-N'-(p-toluenesulfonyl)-p-phenylenediamine [sometimes called SYNERGIST] which is an amine material of the para-phenylenediamine class. It has shown synergistic utility in combination with a second component when used to protect polyolefins.

The second component of the antioxidant system can be comprised of any one of three classes of amine materials having antioxidant ability in polymers. First is the para-substituted diphenylamines such as those disclosed in U.S. Pat. Nos. 3,452,056 and 3,505,225, the disclosures of which are incorporated by reference herein. Representative diphenylamines include, but are not limited to, alkyl-, aryl- and aralkyl-substituted diphenylamines.

A second class of useful products are the quinolines. The preferred types include both the simple compounds formed from quinoline and the polymerized form. Preferred materials include polymerized 2,2,4-trimethyl-1,2-dihydroquinoline, 6-dodecyl-2,2,4-trimethyl-1,2-dihydroquinoline; 6-ethoxy-2,2,4-trimethyl-1,2-dihydroquinoline. The most preferred material is the polymerized 2,2,4-trimethyl-1,2-dihydroquinoline which is commercially available from Uniroyal Chemical Company, Inc. under the trademark NAUGARD Q.

The third class of materials which are useful as the second component of the antioxidant package is para-phenylenediamines which are most commonly known as antiozonants in the rubber plastics industry. Commonly available materials of this class include N-phenyl-N'-(1,3-dimethylbutyl)-p-phenylenediamine; N-phenyl-N'-isopropyl-p-phenylenediamine; N-phenyl-N'-(1,4-dimethylpentyl)-p-phenylenediamine; N-phenyl-N'-(1-methylheptyl)-p-phenlenediamine; N-phenyl-N'-cyclohexyl-p-phenylenediamine; mixed diaryl-p-phenylenediamines, N,N'-diphenyl-p-phenylenediamine; N,N'-di-beta-naphthyl-p-phenylenediamines; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine and blends of these materials.

The polyolefin being stabilized may be selected from any of the high molecular weight homopolymers or copolymers made from alpha olefin monomers such as polyethylene, polypropylene, polyisobutylene, polymethylbutane-1, polymethylpentene-1; copolymers derived from two or more such monomers such as ethylene-propylene copolymers, propylene-butene-1 copolymers, propylene-isobutylene copolymers; and blends of the foregoing homopolymers and/or copolymers thereof.

In order for the antioxidant combination of the first component and the second component to show synergistic activity, the polyolefin must have carbon black pigmentation or loading. The carbon black may be added in the postpolymerization phase or by mechanically blending in any conventional way commonly used for such pigmentation or loading. Levels of carbon black may range from 0.01 percent to about 20 percent. More preferred is 0.1 to about 10 percent and most preferred is 1 to about 5 percent. The identity of the carbon black is not critical, and any of the carbon black grades commonly used for thermoplastic resins are fully suitable. Conductive and non-conductive carbon blacks can be utilized to good advantage. The carbon black is an essential component of the stabilized polyolefin blend of the invention in that it has unexpectedly been found that the synergistic effect of the first and second component of the antioxidant system is fully effective when carbon black is present but shows no effect and, in some cases, is detrimental if carbon black is not present in the polyolefin material. Such results are wholly unexpected, and provide a means for protecting high performance black loaded polyolefins such as linear low density polyethylene against thermal-oxidative attack during both processing and long-term aging of the product. The polyethylenes which are most preferred are the low density (LDPE), high density (HDPE) and most preferred is the linear low density polyethylene (LLDPE) which is commonly produced as a copolymer of ethylene and 1 butene, octene or a higher alkyl hydrocarbon comonomer.

PREFERRED EMBODIMENTS OF THE INVENTION

In order to evaluate the antioxidant activity in a black loaded polyethylene material it is necessary to expose the polyethylene to extremely sever mechanical mastication at relatively high temperatures. Such conditions accelerate the degradation which is seen during service only over extremely long periods of exposure. A test method is recognized in the telecommunication industry for screening antioxidant activity in cable jacketing formulations. This test method utilizes an enclosed mixing head in which the polyethylene is masticated using Sigma-type mixing blades for a period of one hour at 200° C.

Once the intensive high temperature mixing stage is complete it is necessary to evaluate [by a reproducible test method] the relative oxidative stability of the resulting polymer. The test method utilized is generally described as Oxidative Induction Times (OIT) in which a differential scanning calorimeter (DSC) is utilized to determine the onset of oxidation.

TEST SAMPLE PREPARATION

The formulations utilizing a variety of antioxidant packages were prepared by mixing 40 gram batches prepared by weighing linear low density polyethylene resin (DFH-2076 available from Union Carbide) and the antioxidant to be tested into a mixing vessel. The dry resin and antioxidants were then homogenized into a dry blend. In Examples 1–9 and 13–21, a carbon concentrate of 35 percent carbon black, 65 percent LLDPE resin (DFH-20760) was also mixed and dispersed in the mixing vessel with the dry blend. The final concentration of carbon black was 2.6 weight percent in the final mix. The carbon black concentrate contained 0.15 percent 4,4'-thiobis(6-t-butyl-m-cresol). This stabilizer from the carbon black concentrate amounts to only 0.0001 by weight of the final mix, and was deemed not to materially affect the results.

The formulations were mixed for one hour at 200° C. in a C. W. Brabender mixing head containing Sigma-type mixing blades. The model designation was REE-6-230V. The Brabender was run at 125 RPM with the ram closed. This mixing step induced thermal-oxidative degradation. It provides a method of comparing of antioxidant activity in an accelerated test. It simulates extensive extrusion heat history as well as long-term oxidative exposure. This test method is recognized in the telecommunication industry as a good method for screening materials for use as wire and cable jacketing.

The mixed formulations were then compression molded into 10 mil (0.25 mm) thick films by adding the formulation which had been formed into cubes subsequent to the Brabender mixing step. The 0.25 mm films were formed by compressing the cubed formulation between solid platens between polyester sheeting and heated to 140° C. for 3 minutes at a minimum pressure. Then a two minute cycle at 40,000 psig (275 MPa) to compress the formulation into the final 0.25 mm film. Following molding, the formed films were water quenched to solidify the films prior to removal.

Oxidative Induction Times

Circular discs were cut from the 0.25 mm films for placement in aluminum pans for use in a Perkin-Elmer DSC-2C type differential scanning calorimeter (DSC). The test chamber of the DSC calorimeter was purged with nitrogen during conditioning to an isocratic temperature of 235° C. followed by an immediate change to oxygen at a flow rate of 20 cc's per minute to induce thermal-oxidative degradation. Oxidative Induction Time (OIT) is the time span in minutes between reaching an isocratic temperature of 235° C. when the oxygen environment is introduced and the time at which the DSC detects the onset of oxidation.

EXAMPLES 1–21

Test discs were prepared using the above-described mixing and compression molding procedures for various stabilizers being evaluated in the test formulations shown below. The particular stabilizers which were evaluated are shown in the Table of Stabilizers indicating the designation used in the tabular results of the examples as well as the trade name, chemical class and chemical name of the material. The term Control A describes the testing of a disc made solely from the linear low density polyethylene (LLDPE) base resin with the 7.5 percent of carbon black concentrate added. Control A contains no stabilizer. Control A indicates the level of stability which the base polymer has inherently prior to stabilization. Similarly, Control B was used in conjunction with Examples 10–12 to illustrate a non-carbon black loaded linear low density

TABLE OF STABILIZERS

| Designation | Trade Name | Chemical Class | Chemical Name |
| --- | --- | --- | --- |
| PPDA | ARANOX<br>Uniroyal Chemical Company | Para-phenylenediamine | N-phenyl-N'-(p-toluene-sulfonyl)-p-phenylene-diamine |
| DPA | NAUGARD 445<br>Uniroyal Chemical Company | Aralkyl-substituted diphenylamine | 4,4'-bis-(alpha,alpha-dimethylbenzyl) diphenylamine |

TABLE OF STABILIZERS-continued

| Designation | Trade Name | Chemical Class | Chemical Name |
|---|---|---|---|
| PQ | NAUGARD Q Uniroyal Chemical Company | Polymerized quinoline | polymerized 2,2,4-tri-methyl-1,2-dihydro-quinoline |
| AOZ | FLEXZONE 7F Uniroyal Chemical Company | Para-phenylenediamine | N-phenyl-N'-(1,3-dimethylbutyl)-p-phenylenediamine |
| Phenol-1 | NAUGARD XL-1 Uniroyal Chemical Company | Sterically hindered phenol | 2,2'oxamidobisethyl 3-(3,5-di-t-butyl-4 hydroxyphenyl) |
| Phenol-2 | IRGANOX 1010 Ciba-Geiby Corp. | Multifunctional hindered phenol | tetrakis propionate methylene (3,5-di-t-butyl-4-hydroxy hydrocinnamate) methane |
| Phenol-3 | IRGANOX 1035 Ciba-Geigy Corp. | Multifunctional hindered phenol | thiodiethylene bis(3,5-di-t-butyl-4 hydroxy) hydrocinnamate | polyethylene base resin in the unstabilized condition. The test formulations and table of stabilizers are set forth below.

Examples 1-9 set forth the results when two individual stabilizers were added individually to the base resins at the 0.2 percent level. The individual stabilization examples are compared to the use of those same stabilizers in a blend at one-half the levels. Thus, the individual stabilizers are added at 0.1 percent each for a total stabilization of 0.2 percent in the base resin. The test results shown below in Table I in carbon

TEST FORMULATIONS

| | Percent by Weight |
|---|---|
| Control A and Examples 1-9, 13-18: | |
| LLDPE Base Resin (DFH-2076 Union Carbide) | 92.3 |
| Carbon Black/Resin Concentrate (35 percent carbon black, 65 percent base resin) | 7.5 |
| Stabilizer (Identity Variable) | 0.2 |
| | 100.0 |

| | Percent by Weight |
|---|---|
| Control B and Examples 10-12: | |
| LLDPE Base Resin (DFH-2076 Union Carbide | 99.8 |
| Stabilizer (Identity Variable) | 0.2 |
| | 100.00 | black loaded LLDPE resin are grouped in threes for ease of comparison of the blend versus the results of the stabilizers used individually. Therefore, Example 2 shows the use of the PPDA-SYNERGIST used alone in the base resin at the 0.2 level. Example 3 shows a

TABLE I
STABILIZERS IN BLACK LLDPE RESIN

| Example | *Additive | Additive Concentration % | Oxidative Induction Time, (OIT) Minutes | **Improvement Factor (IF) |
|---|---|---|---|---|
| Control A | None | — | 0.3 | — |
| 1 | PPDA/DPA | 0.1/0.1 | 28.6 | 5.3 |
| 2 | PPDA | .2 | 10.6 | — |
| 3 | DPA | .2 | 0.1 | — |
| 4 | PPDA/PQ | 0.1/0.1 | 14.0 | 2.2 |
| 5 | PPDA | 0.2 | 10.6 | — |
| 6 | PQ | 0.2 | 2.2 | — |
| 7 | PPDA/AOZ | 0.1/0.1 | 27.4 | 1.9 |
| 8 | PPDA | 0.2 | 10.6 | — |
| 9 | AOZ | 0.2 | 17.9 | — |

*See Table of Stabilizers for Chemical Class and Structure.
**Improvement Factor = OIT (A/B Blend)/½(OIT$_A$ + OIT$_B$)
i.e.: Improvement Factor Example 1 = 28.6/½(10.6 + 0.1) = 5.3.

TABLE II
STABILIZERS IN NON-BLACK LLDPE RESIN

| Example | *Additive | Additive Concentration % | Oxidative Induction Time, (OIT) Minutes | Improvement Factor (IF) |
|---|---|---|---|---|
| Control A | None | 0.0 | 0.5 | — |
| 10 | PPDA/AOZ | 0.1/0.1 | 16.3 | 1.1 |
| 11 | PPDA | 0.2 | 3.8 | — |
| 12 | AOZ | 0.2 | 25.7 | — |

*See Table of Stabilizers for Chemical Class and Structure.

aralkyl-substituted diphenylamine (DPA) also used at the 0.2 level alone in the base resin. The Oxidative Induction Times (OIT) are shown for those stabilizers used individually. Example 1 sets forth the synergistic effect shown by combining the stabilizers of Examples 2 and 3 at one-half the levels (0.2 percent total) and the Oxidative Induction Time is shown to be 5.3 times the expected level, as shown in the column labeled Improvement Factor (IF). This Improvement Factor is calculated by comparing the OIT of the blend with the arithmetic average of the components of the blend used

TABLE III
NEGATIVE EXAMPLES
STABILIZERS IN BLACK LLDPE RESIN

| Example | *Additive | Additive Concentration % | Oxidative Induction Time, (OIT) Minutes | **Improvement Factor (IF) |
|---|---|---|---|---|
| Control B | None | — | 0.3 | — |
| 13 | PPDA/Phenol-1 | 0.1/0.1 | 4.6 | 0.6 |
| 14 | PPDA | 0.2 | 10.6 | — |
| 15 | Phenol-1 | 0.2 | 4.2 | — |
| 16 | PPDA/Phenol-2 | 0.1/0.1 | 9.7 | 1.1 |
| 17 | PPDA | 0.2 | 10.6 | — |
| 18 | Phenol-2 | 0.1 | 7.6 | — |
| 19 | PPDA/Phenol-3 | 0.1/0.1 | 7.2 | 0.9 |
| 20 | PPDA | 0.2 | 10.6 | — |
| 21 | Phenol-3 | 0.2 | 5.3 | — |

*See Table of Stabilizers for Chemical Class and Structure.
**Improvement Factor = OIT (A/B Blend)/½(OIT$_A$ + OIT$_B$)
i.e.: Improvement Factor Example 1 = 28.6/½(10.6 + 0.1) = 5.3.

individually.

The groups of Examples 4–6 and 7–9 similarly show the synergistic improvement by the use of PPDA with a polymerized quinoline (PQ) and a para-phenylenediamine (AOZ) antiozonant material respectively. The Improvement Factors over the use of the blend components individually are shown to be 2.2 and 1.9, respectively, for Examples 4 and 7. The Examples 1, 4 and 7 set forth the surprising and unexpected results of the invention when the PPDA, specifically N-phenyl-N'-(p-toluenesulfonyl)-p-p-phenylenediamine, is used with another amine antioxidant. The improvement over the individual materials is between 5.3 times and 1.9 times the components used individually. This dramatic improvement in the stabilization to thermal-oxidative degradation is surprising and unexpected. The invention is specifically directed to stabilization only of black loaded polyolefin resins due to the surprising and unexpected result that the same materials used in the calculation of the Improvement Factor. Identical base resin but without carbon black failed to show any significant synergistic improvement as shown below in Examples 10–12.

EXAMPLES 10–12

Table II above describes the results obtained when the identical antioxidant system utilized in Examples 7–9 was incorporated into the base resin without any carbon black added to the resin. Control B is the base resin without any stabilization. Quite surprisingly, the blend yielded an Improvement Factor which was barely above the expected value based on the individual stabilizer components of the blend used individually as shown in Examples 11 and 12 of Table II. As has been previously noted, it was felt that for the purposes of this invention that synergism could not be considered to be shown unless the Improvement Factor was at least 1.7 or above. This high level of improvement would clearly put it above any experimental errors associated with the test procedure being utilized to evaluate the stabilizer systems.

NEGATIVE EXAMPLES

The PPDA of this invention was tested with other classes of phenolic antioxidants such as those listed as Phenol-1, 2 and 3 of from the Table of Stabilizers. The stabilizers are high melting polyphenols or multifunctional phenols which are highly sterically hindered and would be expected to perform well in polyethylene. However, no synergistic effect was noted using the PPDA-SYNEGIST of the invention with any of the hindered phenol antioxidants. The Examples 13–21 are grouped in groups of three experiments to more easily show how the Improvement Factor was obtained in identical fashion to that described previously to the Table I results. Table III sets forth the results which failed to show synergistic effect with phenolic antioxidants since the Improvement Factors ranged between 1.1 down to 0.6. It is to be noted that an Improvement Factor of less than 1 indicates that the blend is less effective than the expected value based on the values of the individual components. In conclusion, it has been determined that N-phenyl-N'-(p-toluenesulfonyl)-phenylenediamine was found to be synergistic with other classes of amines. However, it is not effective as a synergist with phenolic-type antioxidants.

COMMERCIAL UTILITY

The significance of the discovery of the synergistic effect of the N-phenyl-N'-(p-toluenesulfonyl)-p-phenylenediamine with other amines has significant practical use in polyethylene. Since this invention is limited to carbon black reinforced polyolefins, a major use for such black loaded materials in wire and cable jacketing which is an extremely important and high performance use of particularly polyethylene resins such as linear low density polyethylenes. This discovery, that an extremely effective low level combination of para-phenylenediamine of a particular type with other amines, is significant in that it allows the wire and cable manufacturers to protect the cable jacketing during the extremely long-term exposure such jacketing gets in service. The ability of a cable jacket to survive an extremely rigorous environment for a period of 30 to 40 years is presumed to be the normal service requirement for such materials. The synergistic oxidative degradation protection afforded by the use of this synergistic combination will provide long-term protection in such severe long-term applications.

In view of the many changes and modifications that may be made without departing from principles underlying the invention, reference should be made to the appended claims for an understanding of the scope of the protection afforded in the invention.

What is claimed is:

1. A polyethylene composition stabilized against oxidative degradation comprising:
   (a) a polyethylene;
   (b) carbon black homogeneously incorporated in said polyethylene;
   (c) up to 0.2 percent by weight of a stabilizing amount of a N-phenyl-N'-(p-toluenesulfonyl)-p-phenylenediamine first stabilizer component incorporated into said polyethylene; and
   (d) up to 0.2 percent by weight of a second stabilizer component of 4,4'-bis-(alpha,alphadimethylbenzyl)diphenylamine, said first stabilizer and said second stabilizer both being present in synergistic amounts in a ratio between 1:2 and 2:1, all stabilizer percentages being based on weight of said composition.

2. A polyethylene composition according to claim 1, wherein said carbon black is added at about 0.01 to about 20 percent by weight based on said polyethylene.

3. A polyethylene composition according to claim 1, wherein said carbon black is added at a level of about 0.1 to about 10 weight percent based on said polyethylene.

4. A polyethylene composition according to claim 1, wherein said carbon black is added at about 1 to about 5 percent by weight based on said polyethylene.

5. A polyethylene composition of claim 4, wherein said polyethylene is a non-cross-linked polyethylene.

6. A polyethylene according to claim 4, wherein said polyethylene is a linear low density polyethylene.

* * * * *